S. B. BATCHELOR.
SCYTHE SNATH.
No. 10,562.                                    PATENTED FEB. 28, 1854
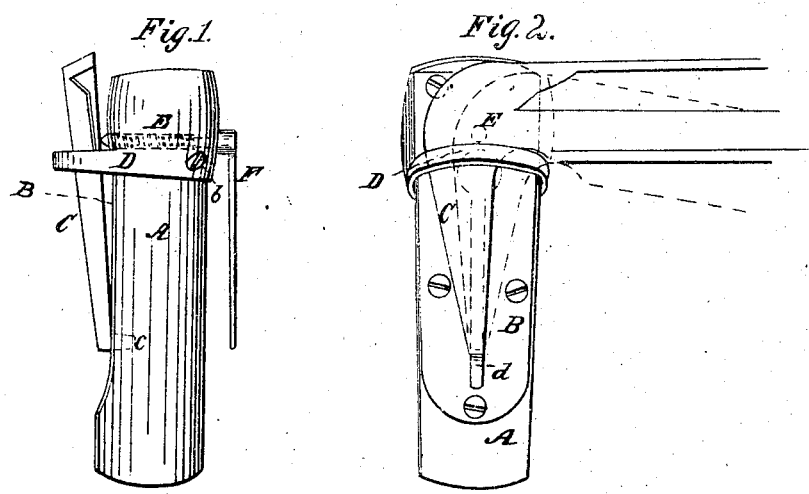
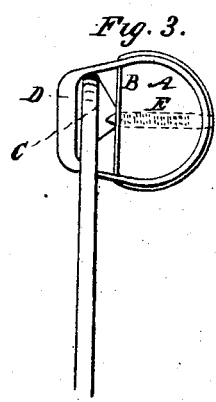

UNITED STATES PATENT OFFICE.

S. B. BATCHELOR, OF LOWVILLE, NEW YORK.

IMPROVEMENT IN SCYTHE-FASTENINGS.

Specification forming part of Letters Patent No. 10,562, dated February 28, 1854.

*To all whom it may concern:*

Be it known that I, S. B. BATCHELOR, of Lowville, in the county of Lewis and State of New York, have invented a new and Improved Mode of Securing Scythes to Snaths; and I do hereby declare that the following is a full, clear, and exact description of the same, reference being had to the annexed drawings, making a part of this specification, in which—

Figure 1 is a front view of the end of a scythe attached to a snath. Fig. 2 is a side view of the same. Fig. 3 is a plan or top view of the same.

Similar letters of reference indicate corresponding parts in each figure.

This invention relates to a new and improved mode of attaching scythes to snaths, whereby scythes may be adjusted to the snath in an expeditious manner and set at any desired point, as will presently be shown.

To enable others skilled in the art to make and use my invention, I will proceed to describe its construction and the manner in which it is operated.

A represents the end or butt of an ordinary snath, chamfered as usual, the chamfered side being shod or covered with a metal plate, B, which has an opening, A, through it lengthwise the plate from near one end to the other, the mortise being made in the snath under the plate deep enough to receive any length of claw which is on the scythe-shank, in which claw C or bent portion at the end of the shank C of the scythe is permitted to slide up or down for the purpose of taking a longer or shorter shank-scythe, which is not the case in any scythe-fastenings now in use, and does away with the objection of having to make a mechanical alteration to fit the shank to the snath. It also has a screw-nut attached to the end of the plate B for the screw E to pass through. The claw is shown by dotted lines in Fig. 1.

D is a movable ring placed around the butt of the snath, with the lower or under part made with a straight horizontal surface and enough larger than the snath in diameter to receive the shank of the scythe. It may be moved up toward the top of snath, thereby enabling the operator to put in any desired scythe-shank. The ring is then slipped down over the scythe-shank, and is fastened by the screw E.

E is a screw with a sharp steel point, which passes transversely through the screw-nut in the metal plate B. The upper end of the screw is square and made tapering, on which a key, F, is placed when the screw is to be turned.

The scythe, it will be seen, is adjustable to the snath by placing the shank of the scythe on the chamfered part of the snath, with the claw C in the opening of the metal plate B. The ring is slipped down over the shank of the scythe. The end of the screw E is then forced or screwed tightly against the inner side of the shank by placing the key on square part of the screw. The shank is thus pressed tightly against the inner surface of the movable ring D. The scythe may be set in or out, forming an acute or right angle with the snath, as described. (See red lines in Fig. 2.) The point of the screw, being made of hardened steel, will consequently countersink itself into the scythe-shank and hold it firmly in the desired position.

Having thus described my invention, what I claim as new, and desire to secure by Letters Patent, is—

The continuous rectangular slot or opening, in combination with the ring D and screw E, by which I am enabled to attach any common scythe to my snath, as herein set forth.

S. B. BATCHELOR.

Witnesses:
S. C. CLARK,
HAZEN WEBSTER.